United States Patent [19]
Crites et al.

[11] 3,803,485
[45] Apr. 9, 1974

[54] INDICATING COATING FOR LOCATING FATIGUE CRACKS

[75] Inventors: Nelson A. Crites; Samuel P. Chambers, both of Columbus, Ohio

[73] Assignee: The Battelle Development Corporation, Columbus, Ohio

[22] Filed: Sept. 25, 1972

[21] Appl. No.: 291,690

Related U.S. Application Data

[63] Continuation of Ser. No. 11,418, Feb. 16, 1970, abandoned.

[52] U.S. Cl.......................... 324/65 R, 73/91, 73/104
[51] Int. Cl. ..................... G01r 27/00, G01n 3/00
[58] Field of Search.................... 324/65 R, 91, 104; 73/88 A, 88 R, 91, 104, 141; 200/61.08; 250/71 T

[56] References Cited
UNITED STATES PATENTS

| | | | |
|---|---|---|---|
| 3,469,439 | 9/1969 | Roberts et al. | 73/141 R |
| 3,511,086 | 5/1970 | Woodmansee | 73/104 |

Primary Examiner—Stanley T. Krawczewicz
Attorney, Agent, or Firm—Mase, Dunson and Warburton

[57] ABSTRACT

Crack propagation through a substantially electrically nonconductive coating bonded to an electrically conductive base is monitored or detected by providing a multitude of reservoirs filled with an electrically conductive liquid within the coating so that cracks propagating through the coating will penetrate one or more of the reservoirs and fill with the liquid through capillary attraction providing an electric current path through the coating thus changing the coating's resistance to an electric current. By providing an electrical connection to the surface of the coating it is possible to detect the existence of cracking by noting changes in resistance or current flow between the metal base and the electrical connection. The invention is particularly useful for detecting cracks in the metal base which will propagate through the coating. A pigment or die to make the cracks visible may be substituted for or supplement the conductive liquid.

25 Claims, 8 Drawing Figures

INDICATING COATING FOR LOCATING FATIGUE CRACKS

This is a continuation of application Ser. No. 11,418, filed Feb. 16, 1970, now abandoned.

BACKGROUND

This invention relates to a method for detecting cracks and is particularly concerned with the monitoring and early detection of fatigue cracks in key structural members.

It is well-known that practically all metal members that are subjected to physical force are stressed in more or less localized areas. For example, any motor or power driven machinery involves the application of torque and/or lever forces to metal members that are generally greater or more concentrated in one location on the member than another. Metals such as steel are not perfectly homogenous, but consist of crystals with planes of cleavage or slip oriented in many directions. When sufficient stress has been applied, slipping occurs on planes within the individual crystalline grains. Although rupture may originate along such slippage or cleavage paths under relatively static loads, it is of little consequence since the stress required to effect such rupture is predictable. However, static loads on metal structural parts are the exception rather than the rule since nearly all machinery and machinery-supporting members are subjected to considerable vibration and thus cyclic stress. Where cyclic stresses are involved, repeated slippage causes minute cracks to nucleate along the slip or cleavage planes at the surface of the metal where the stress is most concentrated. Such cracks propagate inwardly gradually becoming larger and eventually leading to rupture or failure. Such phenomenon is generally referred to as "fatigue cracking" and unlike static load failure is relatively unpredictable.

Fatigue or stress failure can occur on any metal structural member that is subjected to repeated or cyclic stress. Such stress cycles need not be uniform in either magnitude or duration and fatigue cracking may occur within minutes or within years of stress application. For example, one or more key structural members on river spanning bridges may fail from fatigue cracking only after more than 50 years of service or aircraft structural members may fail as a result of fatigue cracking after only a few hours of stress application, in both instances with devastating consequences.

Fatigue cracks on metal members are not readily discernible since they are usually hairline cracks that cannot be seen with the naked eye prior to growing to dangerous proportions. Further, key structural members may not be positioned where they are readily observable were it practical to constantly visually monitor the surface of such members.

Frequently the observation of fatigue cracking comes too late. For example, the large turbines that drive electric power generators in large metropolitan areas may require more than 24 hours to run down after the steam (or driving force) has been turned off so that very early detection of fatigue cracks in key structural members is required to prevent disaster.

In a similar manner failure of key aircraft parts due to fatigue cracking can occur in spite of extensive testing and observation.

A need for a method for monitoring key metal structural members that will give a reliable early positive indication that fatigue cracks have appeared on the metal surface of such members has long existed.

THE INVENTION

We have now discovered a means for monitoring a substantially dielectric material, particularly a coating, that gives a clear indication of the occurrence of cracking. Basically our method and structure consists of providing the coating with entrapped reservoirs or chambers to which such cracks will naturally propagate. The reservoirs are filled with an electrically conductive liquid which fills the cracks by capillary attraction and provides an electric current path thus changing the electrical characteristics of the coating. By providing an electrical contact on either surface of the material or coating, it is possible to monitor or determine the existence of cracking by noting changes in the electrical characteristics of the coating.

Our invention is particularly useful for monitoring the surface of metal structural members and gives a clear early warning that hairline fatigue cracks have occurred on the surface of such members. Our method enables one to determine the existence of hairline cracks while being remotely positioned relative to such a member or to determine the existence of such cracking by means of visual inspection or both.

Basically our invention as applied to structural members consists of coating the surface of a metal member to be monitored or a specific area of such a member known to be subjected to localized stress with a material that is sensitive to crack propagation. We have found that the finest hairline cracks that occur in the metal surface will propagate into such a coating and that if the coating is provided with a supply of an indicating liquid, the liquid will be attracted to and will fill the cracks due to capillary attraction.

The indicating means may consist of merely a pigment in the liquid which makes the hairline crack visible to the naked eye as contrasted to the background color of the coating. Preferably such indicating means will consist of the liquid being relatively electrically conductive as compared to the coating so that by filling a crack propagating through the coating the electrical characteristics of the coating is altered. By making electrical contact with the structural member and the surface of the coating it is possible to determine the occurrence of fatigue cracks by observing changes in the conductivity of the coating and such observation may be made from a position that is remote from the actual structural member or area of such member being monitored.

THE DRAWINGS

The invention is best described in conjunction with the drawings wherein.

Figure 1:
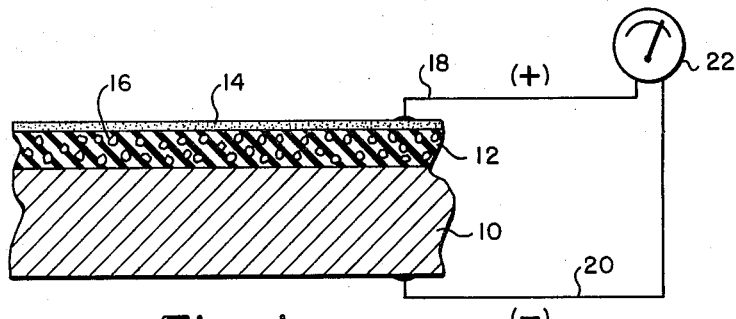
FIG. 1 is an illustrative, enlarged, cross-sectional view of a fragment of a base metal coated in accordance with the present invention and provided with crack detection means.
Figure 6:
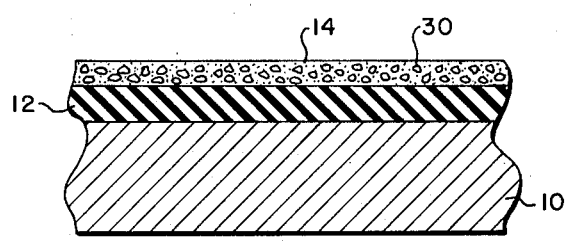
Figure 7:
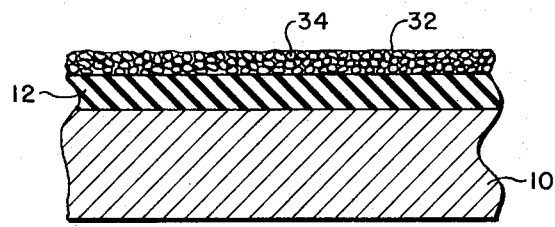
Figure 8:
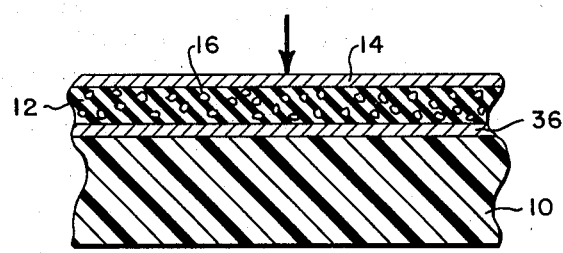

FIGS. 4, 5, 6, and 7 are illustrative, enlarged cross-sectional views of fragments of base metals coated with coatings that are modifications of the coating of FIG. 1 but which are within the scope of the present invention; and FIG. 8 is an illustrative, enlarged, cross-sectional view of a fragment of a nonmetal and nonelectrically conductive base coated in accordance with the present invention and provided with crack detection means.

Figure 2:
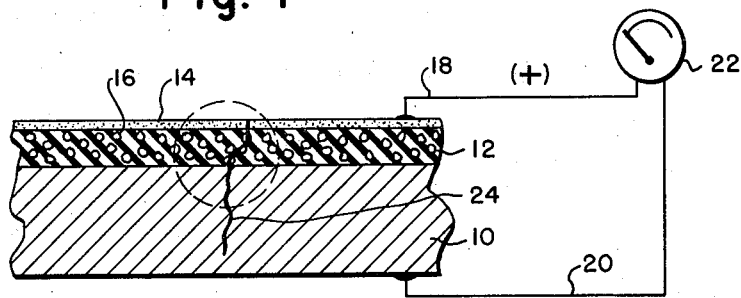
FIG. 2 is a view of the fragment of FIG. 1 showing a fatigue crack in the base metal that has propagated through the coating.
Figure 3:
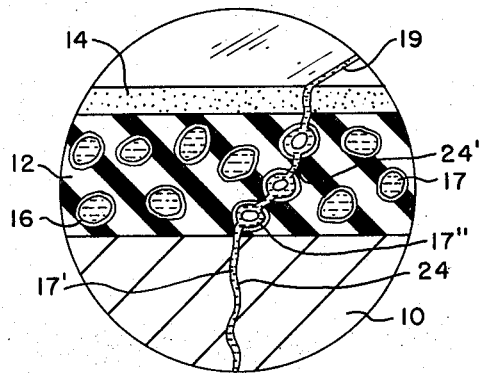
FIG. 3 shows a further enlargement of the area of FIG. 2 affected by crack propagations.

In the embodiment of FIGS. 1–3 the base metal 10 of a structural member subjected to cyclic stress is shown to be coated with a nonconducting or relatively dielectric material 12. Incorporated within the matrix of coating 12 are capsules 16 that contain an indicating liquid 17.

An electrically conductive coating 14 overlays coating 12 and is electrically connected to a lead 18 that is attached to an ohmeter 22. Metal base 10 is connected to the remaining outlet of ohmeter 22 through lead 20. A current potential between leads 18 and 20 is maintained by a power source within ohmeter 22.

As shown by FIG. 1 capsules 16 are dispered within the relatively nonelectrically conductive matrix of coating 12 so that the coating offers maximum resistance to the flow of current between leads 18 and 20 (or base 10 and electrically conductive coating 14) as is reflected by the reading of ohmeter 22. When a fatigue crack 24 (FIGS. 2 and 3) appears on the surface of the metal base 10, it propagates inwardly into the base metal and also outwardly through the coatings 12 and 14. Capsules 16 act as a natural path for crack propagation so that the crack 24' within the coating 12 will propagate from capsule to capsule on its path and through coating 14. The capsules laying in the path of the crack are, of course, ruptured and much of their core of electrically conductive liquid flows into the crack by capillary attraction, filling the crack with the electrically conductive liquid which may penetrate the fatigue crack of the base metal and coating 14 to some extent (see 17'). The surface tension properties of the electrically conductive liquid 17 will prevent it from being completely drawn into the crack 24' of the coating 12 but will cause a film 17'' to remain on the inner surface of the capsules, thus providing a current path between base 10 and coating 14 (and thus leads 18 and 20).

The result is that the electrical resistance of coating 12 drops or is measurably reduced since electrical current between coating 14 and base 10 may flow through crack 24' and this is reflected in the reading of ohmeter 22 (FIG. 2). Thus, it is possible to detect the existence of the crack remotely from the point of potential failure.

Alternately or simultaneously with the above-described phenomenon liquid 17 may contain an easily discernible pigment or ink so that upon penetration of coating 14 (as at 19) the crack may become clearly visible. Thus, the present invention readily lends itself to enhancing the visual observation of fatigue cracking and/or provides a means for remote crack detection.

The matrix of coating 12 may consist of any material which may be applied to the surface of the structural base 10 in the form of a coating. In the embodiment of FIGS. 1–3 such coating must be applied in a manner to incorporate the capsules 16. Coating 12 must, of course, possess the mechanical characteristics of greater fatigue crack resistance than the base 10 at least under the conditions to which the base 10 is exposed. Should the coating crack independently of the base there would be an erroneous indication of fatigue cracking of the base. Many plastic or resinous coating, paints, lacquer, etc., possess greater fatigue resistance than the metal structural members to which the present method is applicable. However, many nonorganic coatings such as ceramic and phosphate base coatings may also possess the requisite fatigue crack resistance. Further, such nonorganic materials generally possess the electrical resistance properties for employing the preferred embodiments of the present invention wherein the change in electrical characteristics of the coating is monitored.

Another requisite of the matrix of coating 12 is that it must be susceptible to crack propagation from the metal base 10. When a fatigue crack such as crack 24 occurs in the base metal of a structural member although it may be a small hairline crack, it tends to open and close during the cyclic stresses being applied to the structural member. It is this action that causes the crack to propagate both into the coating and into the base metal. However, if the elastomeric properties of the coating permits it to stretch a distance to accommodate the width of the crack, the crack may fail to propagate into the coating which, of course, is essential to the operability of the present invention.

The nonorganic coatings such as the above-mentioned ceramic coats, phosphate coats, and like materials (i.e., nearly any continuous metal oxide base coating) all possess sufficiently low elongation properties to permit crack propagation from any metal base (particularly aluminum, titanium, or iron-base structural members).

Among the organic coatings any of the cross-linked, fully cured plastics or resins are operable. Particularly useful materials include the polyesters and epoxies. Any matrix material having elongation properties that do not exceed approximately 20 percent would be operable at least to some extent.

The capsules 16 of the embodiments of FIGS. 1–3 are a convenient means for supplying reservoirs for the conductive liquid 17 positioned in the matrix of the coating 12 in a manner to be readily available to fill a propagating crack such as crack 24. Conductive liquid filled capsules for this use are readily obtainable. One such encapsulation technique is known as coascervation. In one procedure an emulsion of an electrically conductive hydrophobic liquid in water is surrounded with a gelatinizable material such as gelatin which is caused to coascervate or coagulate by various means (temperature or pH adjustment) to effect an encapsulated product. The capsules are hardened, dried, and incorporated into the matrix material of the coating prior to its application to the structural member. Methods for making such capsules are described in U. S. Pat. No. 2,800,457, Green et al.; 2,969,331, Brynko et al.; and 3,173,878, Reyes. Capsules made by this method have an average diameter that is less than about 0.05 inch.

The conductive liquid can be any electrolyte as long as its current carrying capacity exceeds that of the matrix coating. We have had success with a solution of propylene carbonate and potassium dichromate, ethylene glycol with 2 percent borax, and 5 percent SC carbon (tradename of Conductex SC bead-form carbon made by Columbian Carbon Company, 380 Madison Avenue, New York, New York) (milled 24 hours), propylene carbonate and ammonia, 2 percent sodium tetra borate and 10 percent SC carbon, and 10 percent SC carbon (milled) in silicon oil plus other such materials.

The electrically conductive coating 14 may be any material that is capable of carrying an electric current or one that at the very least offers less resistance to an electric current than the matrix of coating 12. For example, coating 14 may consist of metal foil or metal sheet; however, electrically conductive paints or lacquers which may be painted or sprayed onto the surface of coating 12 are most convenient and economical. Also, such a coating may be readily bonded to a matrix 12 which may also have a resin matrix. Such coatings are well-known and usually consist of a resin or polymer carrier containing a dispersion of an electrically conductive particulate material. Such coatings are described in U. S. Pat. Nos. 3,335,111 and 3,278,455.

Where the indicating liquid is provided with a pigment such as ink, coating 14 should either be clear so that the pigmented liquid attracted to the crack is readily discernible or it should consist of a material similar to that of coating 12 so that the crack will propagate through coating 14 to expose the pigmented liquid to the surface.

Figure 4:
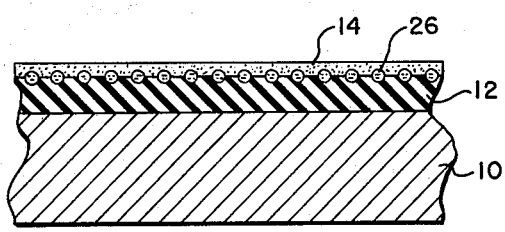

FIG. 4 shows another embodiment of the present invention. In this modified structure coating 12 is painted or sprayed onto the surface of base 10 and before coating 12 is fully hard a series of fine gage wires are laid in side by side and parallel onto the soft surface at least partially sinking into the surface. Electrically conductive coating 14 is brushed or sprayed onto the surface of coating 12 after coating 12 has hardened at least to some extent. After coatings 12 and 14 are cured the wires are withdrawn or pulled out at one end leaving longitudinal parallel capillary channels between coatings 12 and 14 shown at 26 in the cross-sectional view of FIG. 4. Channels 26 may then be filled with the electrically conductive liquid, for example, by inserting a hypodermic needle in the open end of each chamber 26 and filling each chamber with the liquid. The ends of each channel are then sealed.

The embodiment of FIG. 4 is particularly useful where the direction of the cracks may be anticipated to run transversely, or at least not parallel to channels 26, as in fatigue test specimen. In this manner the crack is sure to propagate into one or more of the channels 26 to be filled by the indicating liquid in a manner similar to that described in conjunction with the embodiment of FIGS. 1-3 and visually and/or electrically signal the existence of fatigue cracks.

It may in some instances be desirable in the embodiment of FIG. 4 to subject the assembly to a positive air (or fluid) pressure while sealing the ends of capillary channels 26. In this manner the indicating liquid is under pressure and is urged by the pressure into propagating cracks that penetrate the channel walls.

Figure 5:
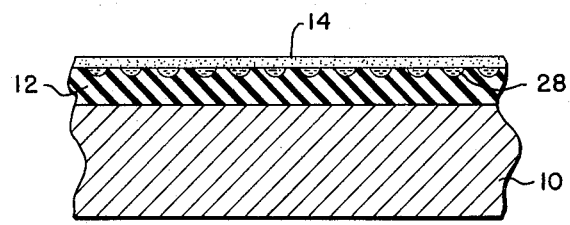

In the embodiment of FIG. 5 depressions have been provided in the surface of coating 12 prior to curing. The depressions may consist of a regular waffle-like pattern created with a die or appropriately embossed plate impressed on coating 12 prior to drying. The depressions may then be filled with the conductive liquid and coating 14 troweled on to leave reservoirs 28 to take the place of and serve the function of capsules 16.

In the embodiment of FIG. 6 capsules 30 may be identical to capsules 16 being merely included in coating 14 rather than coating 12. In this embodiment coating 14 must consist of a matrix in which the fatigue cracks will propagate so that the liquids will be accessible to bridge the coating 12 where an electrical indication is needed. Where an electrical indication is not needed but only a visual observation is desired coating 12 may be eliminated.

In the embodiment of FIG. 7 coating 32 is electrically conductive by virtue of the fact it contains numerous closely packed capsules 34 that are filled with the electrically conductive liquid. The capsule walls of capsules 34 are metal or are at least electrically conductive so that a crack propagating from base 10 through coating 12 will rupture one or more capsules 34 filling the crack with electrically conductive liquid to complete the desired circuit.

In the embodiment of FIG. 8 the base 10 is shown to be constructed of a resin but may consist of wood or other substantially nonconductive material. In this embodiment an electrically conductive coating 36 is positioned between base 10 and coating 12 so that a current measuring device such as ohmeter 22 can be attached to either side of coating 12 to monitor crack propagation within coating 12 in the manner of coating 12 of FIG. 1.

Coating 36 can be a metal foil or any conductive film (relative to coating 12) but most advantageously is an electrically conductive material that may be brushed or sprayed onto the surface of base 10 in the manner of coating 14. Obviously coating 36 may be identical to coating 14.

The function of the embodiment of FIG. 8 may be the detection of fatigue cracks within base 10 as is described in conjunction with the embodiments of FIGS. 1-7. However, another function may be the detection of ruptures caused by external force such as is represented by the arrow. Thus, the embodiment of FIG. 8 may be employed as a burglar alarm when used as a mat strategically positioned and wired to set off an alarm when coating 12 is ruptured by someone stepping on the surface of coating 14.

EXAMPLES

A ¼-inch diameter hole was drilled into the middle of the span (in the area of usual failure) of a constant stress (Krause) steel fatigue test specimen. The area of the hole was then painted with a single coating of an epoxy resin (40 Versamide 125, a tradename of General Mills Company, 60 Epon 828, a tradename of Shell Oil Company). Before the coating could fully set 0.011 inch diameter wires were laid parallel to one another and transverse to the direction of normal fatigue cracking of the specimen. An electrically conductive epoxy coat (BIPAX, a silver containing epoxy manufactured by Tra-Con, Inc., of Medford, Massachusetts) was then applied (painted) over the original coat and wires. After setting, the wires were withdrawn leaving 0.011 inch capillary openings or passageways extending between the coatings leaving a structure such as that illustrated by FIG. 4 of the drawings. A conductive liquid consisting of Ethylene glycol with 2 percent, by weight, borax and 5 percent, by weight, SC carbon (milled 24 hours) was injected into the 0.011 inch diameter bores or capillary passageways with a hypodermic needle leaving a small (≈one-eighth inch) portion of the bores empty. Uncured epoxy was applied to each end of the passageways and cured under 100 psi air pressure.

A wire attached to the electrically conductive epoxy coating and a wire or lead from the specimen were attached to the opposing connections of an ohmeter to monitor the electrical resistance properties of the coatings.

The specimen was loaded into an 1,800 rpm Krause plate bending machine with ≈25° cam divisions (±1500 microinches mean strain × 1½ at hole). The specimen showed a slight leak to ground (decreased resistivity) at 17,200 cycles and at 22,900 cycles a crack was clearly visible with the carbon black (pigment) contrasted on the silver background. At 270,000 cycles resistance was down to 5 megohms and at 282,000 cycles resistance was down to 1.5 megohms. When not running the measured resistance was about half of the listed resistance.

An additional specimen (Specimen No. 2) was prepared and tested as described above. At 17,000 cycles resistance dropped from about 1,000 megohms to 1.5 megohms.

A further specimen (Specimen No. 3) was prepared as described above except both sides were coated and on one side (side A) silicon oil and carbon (milled 24 hours) was the conductive liquid and on the other side (side B) silicon oil and acetone was employed. A still further specimen (Specimen No. 4) was prepared identically to Specimen No. 3 except a polyester coat was substituted for the first epoxy coating. Neither Specimen No. 3 nor Specimen No. 4 were pressurized during sealing. These specimens were tested with 25 cam divisions.

Specimen No. 3, side A, declined in resistance from 1,000 meg to 48 meg after 33,000 cycles and to 14 meg after 67,600 cycles. Side B went from 1,000 megohms to 300 megohms at 50,000 cycles and 1 megohms at 67,600 cycles.

The test results of tests of Specimen No. 4 were as follows:

|  | Cycles | Resistance (ohms) |
|---|---|---|
| Specimen 4, Side A | 0 | 1000 meg. |
|  | 35,000 | 40 meg. |
|  | 40,000 | 200 meg. |
|  | 50,000 | 25 meg. |
| Side B | 0 | 1000 meg. |
|  | 18,000 | 7 meg. |
|  | 40,000 | 20 meg. |
|  | 50,000 | 7 meg. |

A solution of ammonium chloride and glycerine was encapsulated with gelatin substantially in the manner taught by U. S. Pat. No. 2,800,457. The capsules (0.020–0.030 inches diameter) were incorporated in the above-described epoxy and polyester coatings (mixing about 10 grams of capsules in 1,000 grams of uncured resin) and applied to Krause specimens. Otherwise, test specimens and conditions were as described above. Results were as follows:

| Cycles | Running Resistance Ohms × 10$^{+3}$ |
|---|---|
| 0 | 1,000,000 |
| 4,000 | 1,000,000 |
| 4,800 | 5,000 |
| 7,000 | 5,000 |
| 8,800 | 3,000 |
| 12,000 | 4,000 |
| 16,200 | 4,000 |
| 18,600 | 3,000 |
| 20,500 | 3,000 |
| 24,000 | 4,000 |
| 29,000 | 4,000 |
| 33,000 | 3,500 |
| 36,200 | 2,000 |
| 39,700 | 1,200 |
| 42,600 | 1,200 |
| 49,000 | 1,100 |
| 55,000 | 700 |
| 61,000 | 300 |
| 69,000 | 250 |
| 74,000 | Specimen Failed | 100 |

Although many applications, uses, and modifications of our invention are obvious from the above description, we particularly envision the following:

a. Encapsulated Conducting Fluid Film

The base matrix containing the encapsulated conducting fluid may be cast in the form of a tape or patch of desired dimensions, and then frozen to arrest curing. At the time of application, the tape or patch is thawed, cemented to the structural member, and allowed to finish curing. The upper, electrical conducting layer may be applied to the cast tape or patch at time of manufacture, or painted on at the time of application to the structural member.

b. Emulsion of Conducting Fluid and Base Matrix

The above embodimensts of the indicating coating may also be accomplished using an emulsion of the base matrix and the conducting fluid. It will be necessary to wash the upper surface after the base matrix has cured to remove any conducting fluid prior to the application of the upper, electrically conducting layer.

c. Conducting Fluid Contained in Capillary Tubes

Conducting fluids contained in capillary tubes in the base matrix is an embodiment of the Indicating Coating invention which is particularly applicable to tapes. The conducting fluid is contained in closely spaced parallel capillary tubes in the tape. The tape is frozen to arrest curing, and applied as described above. The tape would be applied in such a direction that any fatigue cracks are likely to develop across the capillaries.

The tape or patch may also be constructed with two layers of capillary tubes running at right angles to each other. In this way the orientation of the fatigue crack is not critical.

The tape configuration with parallel capillary tubes would particularly lend itself to extrusion, at which time the capillaries could be extruded in place to be filled at a later time with conducting fluid, or filled with conducting fluid at the time of extrusion.

It will be understood that the above description and examples encompass many obvious modifications that fall within the scope of the claims. For example, the invention relates primarily to the detection of cracks that propagate through a coating such as coating 12 of FIG. 1 irrespective of the exact use to which the invention is applied.

Where a coating such as coating 14 is employed it may be designed for crack propagated therethrough or to resist crack propagation.

Also, liquid 17 need be a liquid only at the operating or test temperatures and may well be a solid embedded in a matrix of coating 12 at other temperatures.

It will be understood that the term "fatigue resistance" as it is used in the present specification and claims relate to the fatigue endurance level of the material. Thus, a high fatigue resistance is a "high fatigue endurance level" and a greater fatigue resistance of one material over another is a higher fatigue endurance level of the former over the latter.

We claim:

1. A method of determining the occurance of crack propagation through a preselected area of a member comprising:
   a. providing a multitude of chambers in proximity to said member in a position where cracks in said member will penetrate said chambers;
   b. providing said chambers with a liquid capable of filling said cracks; and
   c. providing means of detecting said liquid thereby indicating the failure of said member.

2. A method for determining the occurrence of crack propagation through a preselected area of a member between opposing surfaces thereof comprising:
   a. providing a multitude of chambers within said member positioned between said surfaces so that propagating cracks will penetrate said chambers;
   b. providing said chambers with a liquid having an electric current carrying capacity that exceeds that of said member so that cracks penetrating said chambers will be filled with said liquid;
   making electrical contact with each of said opposing surfaces disposed so that said cracks will propagate between at least one pair of the electrical connections; and
   d. monitoring changes in the electrical current carrying capacity of said member between opposing pairs of said contacts so that current paths caused by said liquid within propagating cracks will increase said current carrying capacity and indicate the presence of said cracks.

3. The method of claim 1 wherein said chambers consist of a multitude of capsules of an average diameter of less than 0.05 inch dispersed within the matrix of said member.

4. The method of claim 1 wherein said chambers consist of a multitude of capsules of an average diameter of less than 0.5 inch dispersed in a matrix juxtapositioned to said member.

5. The method of claim 1 wherein said chambers are positioned in one surface of said member.

6. The method of claim 3 wherein said chambers are affected by dispersing said capsules into the matrix of said member while said matrix is in a liquid state and solidifying said member from the liquid state to yield a solid member.

7. The method of claim 2 wherein said member is a coating that is applied to a metal substrate with said chambers being created while said member is in a liquid state and subsequently solidifying said coating, said metal substrate being one of said electrical connections.

8. The method of claim 7 wherein said metal substrate is a structural member that is subjected to cyclic stress and said coating consists of a material that has a greater fatigue resistance that said metal and elongation prpoerties that do not exceed about 20 percent so that fatigue cracks occurring within said metal base or structural member will propagate through said coating to provide an electric current path.

9. The method of claim 8 wherein said coating consists of a cross-linked resin.

10. The method of claim 8 wherein the electrical connection opposing said metal consists of a coating having electrical current carrying properties.

11. The method of claim 8 wherein said chambers consist of capsules dispersed within said coating that have an average diameter of less than 0.050 inch.

12. The method of claim 8 wherein said chambers contain a pigment in addition to said current carrying liquid.

13. The method of claim 2 wherein said electrical connections and said member consist of coatings, said electrical connection being positioned on opposite surfaces of said member coating and all three of said coatings being sequentially applied to the surface of a relatively non-conductive base.

14. A structure disposed to indicate the existence of a crack comprising:
   a. a multitude of chambers in proximity to a member with said chambers in a position where a crack in said member will penetrate said chambers;
   b. liquid in said chambers capable of filling a crack in said chamber; and
   c. means of detecting said liquid in said crack.

15. The apparatus of claim 14 wherein the means of detecting said crack comprises an apparatus monitoring the electrical conductivity between opposite surfaces of a matrix containing said chambers.

16. A structure disposed to indicate the existence of a crack therein comprising:
   a. an electrically conductive base;
   b. a substantially electrically nonconductive coating overlaying and bonded to an electrically conductive base, said coating consisting of a material having a greater fatigue resistance than the material of said electrically conductive base and elongation properties no greater than 20 percent;
   c. a plurality of reservoir chambers positioned between the surfaces of said coating so that crack propagation through said coating will penetrate at least some of said chambers, said chambers being filled with a liquid having greater electric current carrying capacity than said coating;
   d. electric current carrying means positioned on the surface of said coating so that cracks propagating through said coating from said base will fill with said liquid and form a current path between said conductive base and said current carrying means so as to increase electric current flow capacity between said conductive base and said current carrying means; and
   e. means for measuring the potential electric current flow capacity between said conductive base and said current carrying means.

17. The apparatus of claim 16 wherein said chambers consist of microcapsules dispered throughout the matrix of said coating, said microcapsules having an average diameter of less than 0.05 inch.

18. The apparatus of claim 16 wherein said electric current carrying means include an electrically conductive coating overlaying said relatively electrically nonconductive coating.

19. The apparatus of claim 18 wherein said chambers are positioned between said electrically conductive coating and said substantially nonconductive coating.

20. The apparatus of claim 14 wherein said chambers are positioned in one surface of said member.

21. The apparatus of claim 14 wherein said chambers consist of a multitude of capsules dispersed in a matrix juxtaposed to said member.

22. A structure disposed to indicate the existence of a crack therein by use of a coating on said structure comprising:

a. an electrically conductive base;
b. a first substantially electrically nonconductive coating overlaying and bonded to said base; said first coating having resistance to fatigue crack formation that is greater than said base and an elongation that is less than 20 percent;
c. a second coating overlaying said first substantially electrically nonconductive coating formed of a substantially non-conductive matrix containing a plurality of microcapsules, said microcapules being formed with electrically conductive walls and electrically conductive liquid cores, said capsules being placed in said matrix at a density to render said second coating electrically conductive, said matrix consisting of a material having a modulus of elasticity that is less than said base and elongation properties that do not exceed 20 percent, so that said cracks propagating through said first substantially nonconductive coating will propagate into said second overlaying coat to penetrate one or more of said capsules to fill said cracks with said conductive liquid and provide an electric current path through said first substantially nonconductive coating changing the current carrying capacity through said first coating; and
d. means for measuring said change in current carrying capacity.

23. The structure of claim 22 wherein said electrically conductive liquid contains a pigment to render said cracks visible.

24. A structure disposed to indicate the existence of a crack therein comprising:
a. a metal base;
b. a coating overlaying said base capable of being cracked by the presence of a crack in said base with said coating consisting of a material that has a greater resistance to the formation of fatigue cracks than said base and elongation properties no greater than 20 percent; and
c. a plurality of reservoir chambers positioned between the surfaces of said coating so that crack propagation through said coating will penetrate at least some of said chambers, said chambers being filled with an indicating liquid disposed to render said crack detectable.

25. The structure of claim 24 wherein said indicating liquid is a dye disposed to fill a crack propagating through said coating and render it visible.

* * * * *